United States Patent [19]

Scheyer

[11] Patent Number: 4,774,767
[45] Date of Patent: Oct. 4, 1988

[54] WATER LEVEL
[75] Inventor: Dietmar Scheyer, Götzis, Austria
[73] Assignee: Firma Ing. Guido Scheyer, Götzis, Austria
[21] Appl. No.: 19,484
[22] Filed: Feb. 26, 1987
[30] Foreign Application Priority Data Feb. 28, 1986 [AT] Austria ................. 517/86

[51] Int. Cl.⁴ .......................................... G01C 9/28
[52] U.S. Cl. .................................. 33/388; 33/384
[58] Field of Search ............... 33/343, 349, 383, 384, 33/385, 386, 387, 388

[56] References Cited

U.S. PATENT DOCUMENTS

| | | | |
|---|---|---|---|
| 1,703,589 | 2/1929 | Myers | 33/387 |
| 1,920,892 | 8/1933 | Rogers | 33/387 |
| 2,453,091 | 11/1948 | Holloway et al. | 33/384 |
| 2,692,440 | 10/1954 | Walters | 33/383 |
| 2,770,889 | 11/1956 | Allegretti et al. | 33/385 |
| 2,993,281 | 7/1961 | Dock | 33/384 |
| 3,638,527 | 2/1972 | Weissenberg | 33/385 |
| 3,750,301 | 8/1973 | Johnson | 33/384 |
| 4,073,062 | 2/1978 | Wright . | |
| 4,151,650 | 5/1979 | Russo . | |
| 4,320,581 | 3/1982 | Ousterhost . | |

FOREIGN PATENT DOCUMENTS

| | | |
|---|---|---|
| 3143392 | 5/1983 | Fed. Rep. of Germany . |
| 3310359 | 9/1983 | Fed. Rep. of Germany . |
| 118314 | 3/1947 | Sweden ............... 33/385 |
| 2157433 | 10/1985 | United Kingdom . |

Primary Examiner—Harry N. Haroian
Attorney, Agent, or Firm—Toren, McGeady & Associates

[57] ABSTRACT

A water level or spirit level having at least one water level member whose angular adjustment relative to the contact surface can be changed. The water level member is rotatably mounted on the level body or a structural part fixedly connected to the level body. The water level member is fixable in the desired angular position relative to the level body or the structural parts connected to the level body. The rotatable water level member has at least one circumferentially extending flange which engages under a clamping jaw. The clamping jaw can be pressed against the surface of the flange by means of a manually operated clamping member.

15 Claims, 1 Drawing Sheet

WATER LEVEL

BACKGROUND OF THE INVENTION

1. Field of the Invention

The present invention relates generally to water levels. The invention relates specifically to a water level or spirit level having at least one water level member whose angular adjustment relative to the contact surface can be changed. The water level member is rotatably mounted on the level body or a structural part fixedly connected to the level body. The water level member is fixable in the desired angular position relative to the level body or the structural part connected to the level body.

2. Description of the Prior Art

For the measurement of inclined surfaces, water levels are known in which the water level member can be adjusted relative to the level body, so that it is possible to measure the accuracy of an inclination of, for example, 30° or 45° by means of the water level. For this purpose, the water level members are rotatably mounted in the level body. The water level members can be adjusted in accordance with an angular graduation printed or placed onto the level body. In order for a water level of this type to be useful, the water level member must be fixable in the desired anchoring position relative to the level body.

In a known water level of this type, a water level member is relatively tightly mounted in a structural part of the water level so that it cannot be easily rotated. Thus, it is ensured that the angular position of the water level member is not unintentionally changed. However, on a construction site where a water level is subjected to rough handling, a water level of this type is not suitable because the adjustment of the water level member may be changed when it is struck or when a person touches it with his hands.

In another known water level of this type, the water level member is composed of two structural components which are screwed together. The water level member can be rotated relative to the level body after the screw connection has been released. However, it is subsequently necessary to use a screw driver or a similar tool when the water level member is to be fixed into a certain angular position.

It is, therefore, the primary object of the present invention to provide a water level of the above-mentioned type in which the desired angular position of the water level member relative to the level body can be easily adjusted and in which the water level member can be fixed in its angular position without the requirement of special tools.

SUMMARY OF THE INVENTION

In accordance with the present invention, the rotatable water level member has at least one circumferentially extending flange which engages under a clamping jaw, wherein the clamping jaw can be pressed against the surface of the flange by means of manually operated clamping means.

The arrangement of the water level member in accordance with the present invention makes it possible in a simple manner to fix the angular position of the water level member from outside or from a side of the water level. The provision of the circumferentially extending flange makes it possible to have a water level member of very simple construction. The water level member is fixed in the adjusted angular position by means of clamping jaws which can be pressed against the flange. As further provided by the present invention, the clamping jaws can be pressed by manually operated clamping means against the flange surface.

The water level in accordance with the present invention is not only of very simple construction, but it also can be easily manipulated because the clamping action effected by the clamping jaws can be reeased by a single manual operation. It is then possible to easily and quickly rotate the water level member. Subsequently, a single manual operation is sufficient to press the clamping jaws with the use of the clamping means against the flange surface of the circumferentially extending flange, so that the adjusted angular position is again securely fixed. A quick and simple adjustment of the water level member without the aid of special tools is of particular advantage when the water level is used on construction sites or during assembly work.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE INVENTION

Figure 1:
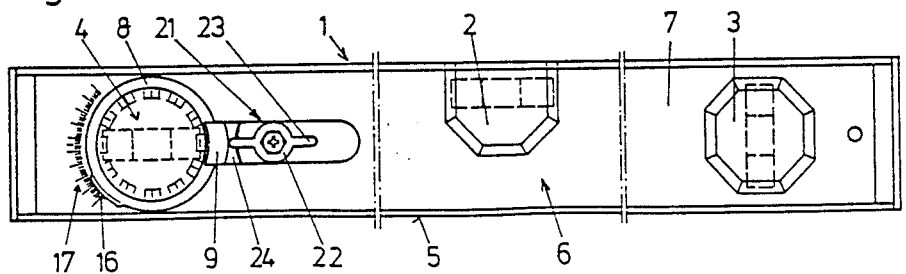
FIG. 1 is a front elevational view of a water level according to the invention.

FIG. 1 of the drawing illustrates a water level 1 which includes three water level members. As in conventional water levels, a first water level member 2 serves for taking measurements in horizontal direction and a second water level member serves for taking measurements in vertical direction. A third water level member 4 can be adjusted into different angular positions relative to a contact surface 5 of level body 6. Thus, in addition to measurements in horizontal and vertical directions, it is also possible to take measurements of surfaces extending in different angular directions.

In the embodiment illustrated in the drawing, the level body of the water level is an I-section. The water level members 2–4 are mounted in the web 7 of level body 6. Of course, the object of the present invention can also be met in water levels made of a hollow section or of a solid section. In these cases, only slight structural changes have to be made.

The essential feature of the present invention resides in the provision of at least one circumferentially extending flange 8 mounted on the rotatable water level member 4. Flange 8 engages under a clamping jaw 9 which can be pressed against flange 8.

The water level member 4 is composed of two structural components 10 and 11 which each have a circumferentially extending flange 8. The two structural components 10 and 11 are mounted in a bore of level body 6; specifically, the structural components 10 and 11 are mounted in web 7 of level body 6. The two structural components 10 and 11 are rigidly connected to each other by gluing or welding. Once the structural components 10 and 11 are connected to each other, the water level member is irremovably mounted in level body 6 because of the presence of the flanges 8.

It is desirable that the water level member 4 cannot be rotated too easily even when the clamping jaws 9 are not pressed against flanges 8, so that a simple and secure adjustment of the water level member 4 into a certain angular position is possible. For this purpose, plate spring-like ring members 13 are placed between the flanges 8 of water level member 4 and the surface 12 of the web 7 of level body 6.

In order to facilitate the manipulation of the water level member 4 and for an easier adjustment of the angular position of the water level member, each structural component 10 and 11 has an outwardly projecting annular portion 14 which extends essentially perpendicularly to flange 8. The outwardly facing surface of the annular portion 14 may be wave-like or tooth-like or of similar shape.

The outer circumference of each flange 8 has a nose-like marking protuberance which interacts with an angular graduation 17 provided on the body 6. Since, due to the limited space available on level body 6, the graduation cannot be finer than 2°, another advantageous embodiment of the present invention provides that additional marking projections 18 are provided on both sides angularly offset relative to the nose-like marking projection 16. The marking projections 18 have the function of a Vernier scale. Thus, if an intermediate adjustment is required to an uneven degree graduation, the marking projection 16 can be moved approximately into the center between the two appropriate scale markings, while the exact position can be obtained by matching the two marking projections 18 with the appropriate markings on angular graduation 17.

In the illustrated embodiment, the clamping jaws 9 include lugs 19 fastened to web 7 of level body 6. The free ends of the clamping jaws 9 are stepped and the stepped portions engage over flanges 8 of water level member 4. At least in the area immediately adjacent flanges 8, the clamping jaws 9 are spaced from the surface 12 of web 7, so that a gap remains between the bottom side 20 of each clamping jaw 8 and the surface 12 of web 7. This gap makes it possible to exert an appropriate pressure on clamping jaws 9 in order to press them against flanges 8.

In the region where the clamping jaws 9 make contact with the corresponding surface of the flanges, the clamping jaws 9 may form a further step, so that a relatively small contact surface and, thus, a secure pressing area are provided.

Figure 3:
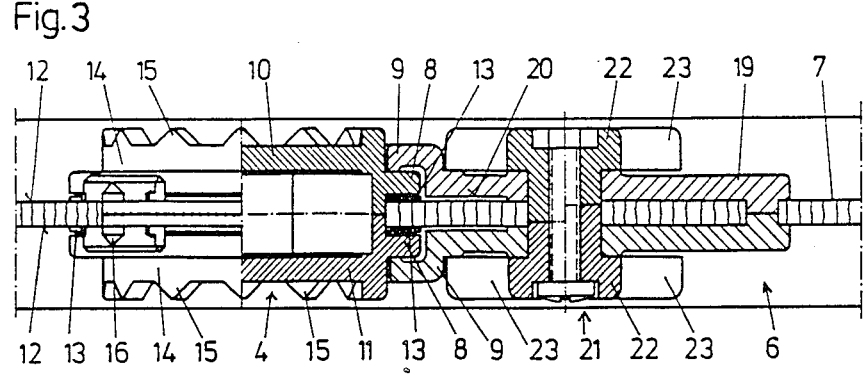
FIG. 3 is a sectional view taken along sectional line I—I of FIG. 2.
Figure 2:
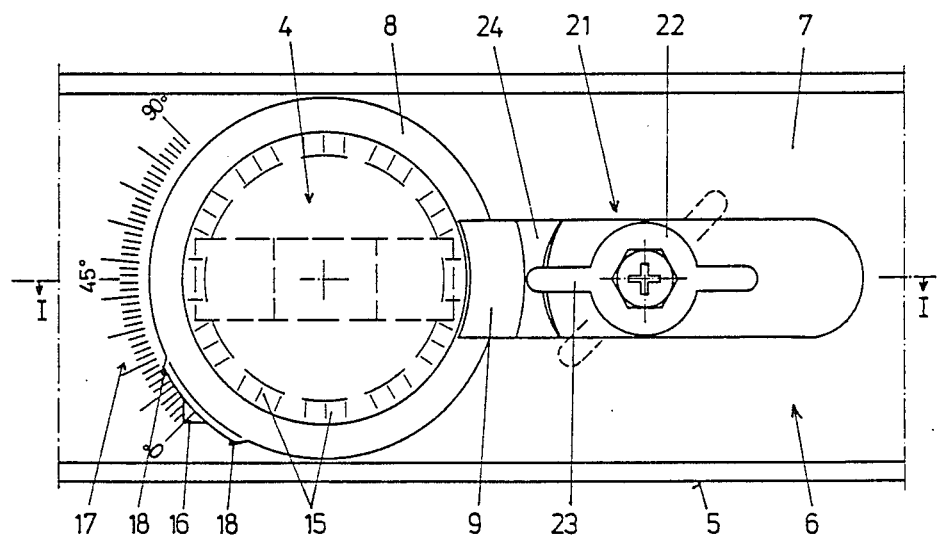
FIG. 2 shows, on a larger scale, a detail of the water level of FIG. 1.

The clamping jaws 9 are tightened by means of a rotatable and/or slidable clamping member. Accordingly, it would be conceivable to provide a slidable clamping member which is moved relative to an inclined abutting surface in the direction toward the water level member 4. In the illustrated embodiment, a rotatable clamping member 21 is provided. The clamping member includes an actuating knob 22 having at least one clamping finger 23. The free end portion of the clamping jaw 9 defines an abutting surface 24 which interacts with the rotatable clamping member 21 and particularly with clamping finger 23. In the release position illustrated in broken lines in FIG. 2, the clamping fingers 23 are located outside of the range of engagement with abutting surface 24. Accordingly, clamping jaws 9 rest without pressure on the circumferentially extending flanges 8. However, as soon as actuating knob 22 is rotated, one of the clamping fingers 23 is moved onto inclined abutting surface 24, so that this free end of clamping jaw 9 is pressed downwardly, i.e., in the direction towards the surface 12 of web 7. As a result, clamping jaw 9 presses against flange 8 of water level member 4.

As is clear from the above, the illustrated embodiment of the water level according to the invention includes two flanges 8 and two clamping jaws 9. Of course, it would also be conceivable to have an arrangement with only a single flange 8 and a single clamping jaw 9, however, the arrangement of two flanges and clamping jaws result in a better clamping force. In the illustrated embodiment, the rotatable clamping member 21 extends through web 7 of level body 6 and through the two clamping jaws 9. At the free ends of clamping member 21 are provided actuating knobs 22 which are connected to each other so as to rotate together. The actuating knobs 22 have radially projecting clamping fingers 23. Accordingly, it is not necessary to actuate the clamping member from both sides; rather, an actuation of the clamping member 21 on the one side at the same time causes a clamping on the other side of the level body.

Instead of the two diametrically oppositely located clamping fingers 23, it would also be possible to provide only a single clamping finger 23. This clamping finger 23 can have any desired shape. However, the arrangement of two clamping fingers 23 is preferred because a better force transmission by the person actuating the clamping member is possible without requiring any additional devices or tools. It would also be conceivable to provide the clamping member 21 itself with an inclined abutting surface, so that depending on the angle of rotation of the actuating knob, the clamping jaws 9 are more or less clamped against the flanges 8. It would also be possible to have a combined action of an inclined abutting surface 24 on clamping jaws 9 and an inclined abutting surface on the clamping member 21. In accordance with another advantageous development, the abutting surface is inclined toward both sides of the clamping jaws 9, so that the clamping action can be obtained by turning the clamping member 21 in either direction.

However, it is always important in this connection that a clamping jaw 9 is provided which presses against a circumferentially extending flange 8, and that this clamping jaw 9 is pressed on by means of appropriate rotatable and/or slidable parts. Accordingly, the rotatable or slidable parts do not directly act on the water lever member 4, so that the danger of an unintentional adjustment of the water level member 4 during the clamping procedure is avoided.

Clamping members other than the rotatable or slidable clamping members discussed above can also be used. For example, an eccentric roller for pressing the clamping jaws 9 can be used. This eccentric roller would be rotatable about an axis extending parallel to web 7. Moreover, it is not absolutely necessary that the rotatable clamping member 21 extends through the center of clamping jaw 9. Rather, the clamping member 21 can also be arranged outside of the area covered by the clamping jaws 9.

The present invention has hereinabove been described with the aid of an embodiment in which the level body is an I-section. After only slight structural changes are made, all types of water levels can be equipped with the arrangement according to the invention. For example, if the level body is a hollow section, the clamping jaws 9 and the flanges 8 as well as the clamping fingers 23 etc. can be arranged on the inner side of the hollow section, while the rotatable clamping member and the actuating knob 22 can be arranged on the outer surfaces of the level body.

Furthermore, it would also be possible in accordance with the invention to mount the water level member 4 not directly in the web 7 or in the level body, but rather so as to be rotatable on another structural component, wherein this structural component, for example, a plastics material body, would be fixedly connected with the level body. The clamping jaws 9 would then be arranged either on the level body or on the stationary structural component. Of course, the clamping members would also have to be mounted accordingly. In accordance with the present invention, a water level is provided in which the structure for adjusting the angle of the water level member is very simple. Additionally, the water level can easily be assembled and a secure fixing of the water level member in its angular position is possible.

While the specific embodiment of the invention has been shown and described in detail to illustrate the application of the inventive principles, it will be understood that the invention may be embodied otherwise without departing from such principles.

I claim:

1. A water level, comprising a water level body, a water level member rotatable about an axis and adjustable with respect to a contact surface of the water level body, the water level member connected to the water level body, the water level member comprising at least one circumferentially extending flange, at least one clamping jaw engaged by the at least one flange, manually operated clamping means for pressing the at least one clamping jaw against the at least one flange, so that the water level member can be fixed in an angular position relative to the water level body, the water level member comprising two structural components, a tubular level mounted between the two structural components, each strucutral component comprising a circumferentially extending flange, the water level body defining a bore, the two structural components being placed in the bore and fixedly connected to each other, wherein the at least one clamping jaw is a lug fastened to the water level body, the lug having a stepped free end, the stepped end of the lug engaging the at least one flange, and wherein, at least in the immediate vicinity of the at least one flange, the at least one clamping jaw with a free end portion is spaced from the surface of the water level body.

2. The water level according to claim 1, wherein the water level member is mounted on a structural part fixedly connected to the water level body.

3. The water level according to claim 1, wherein the two structural components are welded together.

4. The water level according to claim 1, wherein the two structural components are glued together.

5. The water level according to claim 1, comprising a plate spring-like annular member placed between the flanges and the water level body.

6. The water level according to claim 1, wherein the water level member includes an outwardly projecting annular portion extending perpendicularly to the at least one flange, wherein the outwardly facing surface of the annular portion is wave-shaped.

7. The water level according to claim 1, wherein the water level member includes an outwardly projecting annular portion extending perpendicularly to the at least one flange, wherein the outwardly facing surface of the annular portion is tooth-shaped.

8. The water level according to claim 1, wherein the outer periphery of the at least one flange has a nose-like first marking projection, and an angular graduation interacting with the marking projection placed on the water level body.

9. The water level according to claim 8, wherein the outer circumference of the at least one flange includes additional marking protections angularly offset relative to the first marking projection, the additional marking projections serving the function of a Vernier scale.

10. The water level according to claim 11, comprising a rotatable clamping member acting on the free end portion of the clamping jaw.

11. The water level according to claim 1, wherein the free end portion of the clamping jaw defines an abutting surface which interacts with a rotatable clamping member.

12. The water level according to claim 11, wherein the clamping member includes an actuating knob rotatable about an axis, the axis of the actuating knob extending parallel to the axis of the water level member, the actuating knob comprising at least one radially projecting clamping finger which interacts with the abutting surfaces.

13. The water level according to claim 12, wherein the rotatable clamping member extends through the water level body and at least two clamping jaws, wherein the clamping member has two free ends, and wherein at both free ends of the clamping member are mounted actuating knobs having radially projecting clamping fingers.

14. The water level according to claim 13, wherein each actuating knob has two diametrically projecting clamping fingers.

15. The water level according to claim 11, wherein the abutting surface is inclined downwardly from the side edges of the clamping jaw.

* * * * *